W. M. SCOTT.
CONTROL SYSTEM.
APPLICATION FILED NOV. 12, 1917.
1,336,488.
Patented Apr. 13, 1920.
5 SHEETS—SHEET 1.
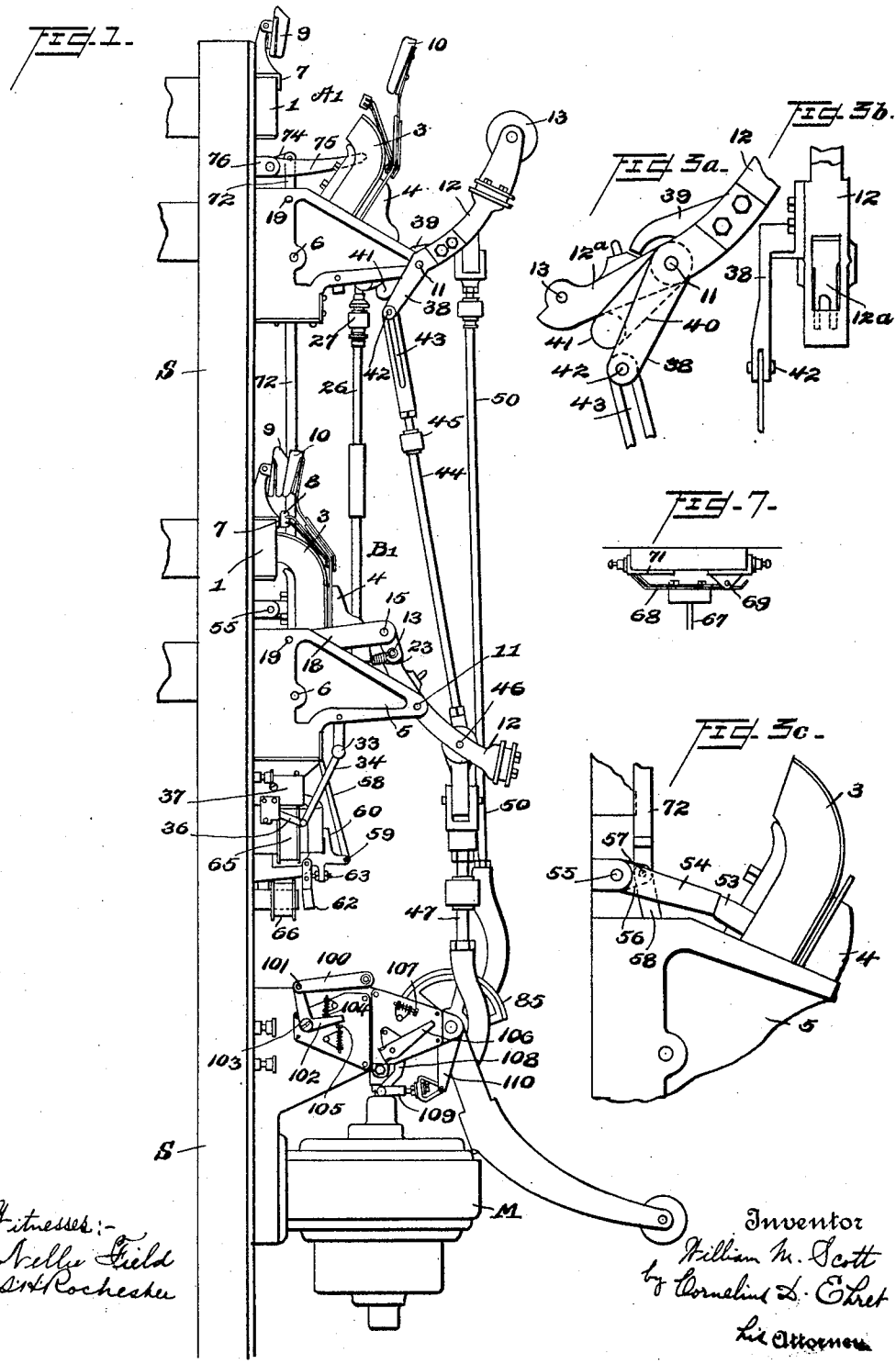

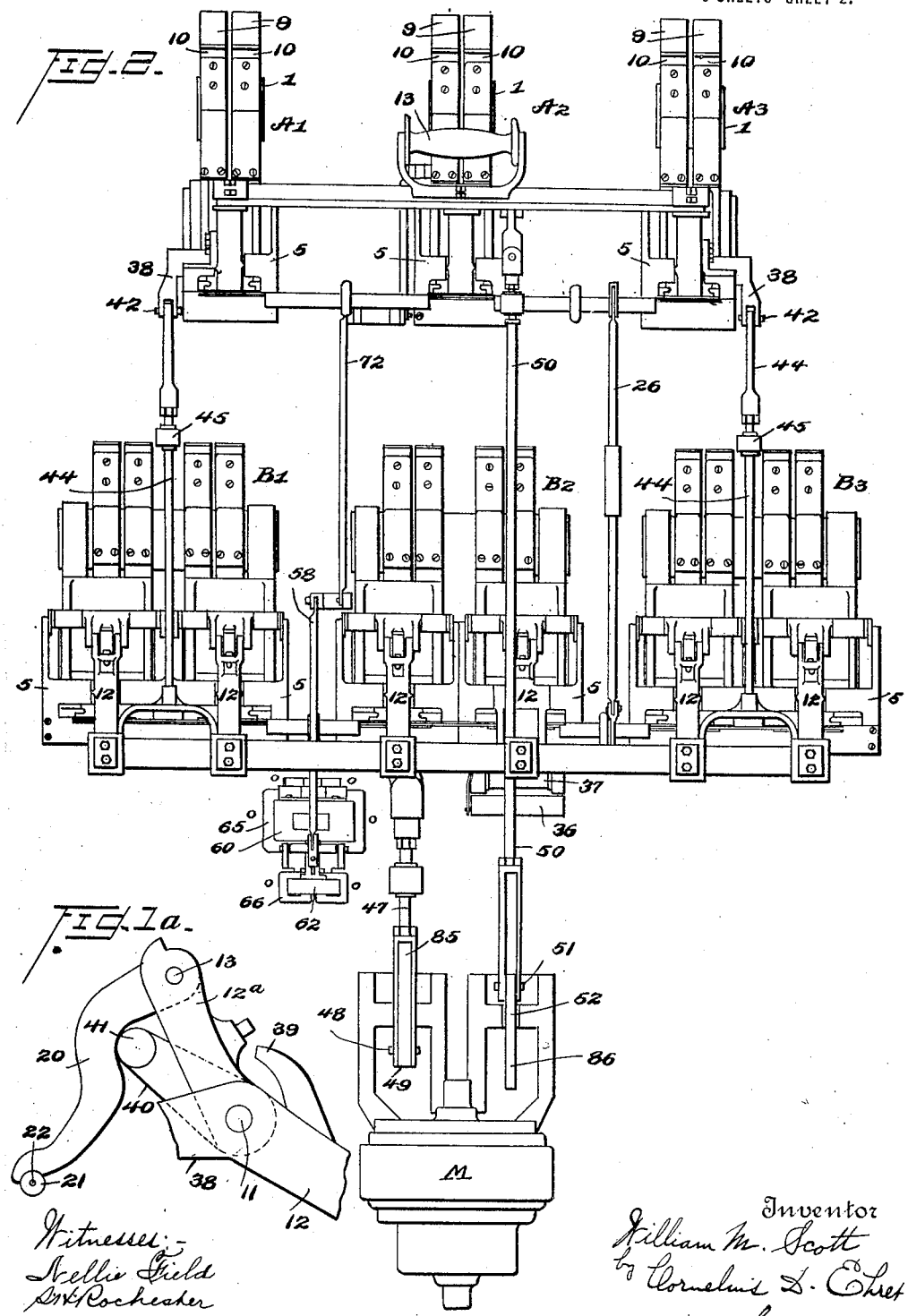

W. M. SCOTT.
CONTROL SYSTEM.
APPLICATION FILED NOV. 12, 1917.
1,336,488. Patented Apr. 13, 1920.
5 SHEETS—SHEET 3.
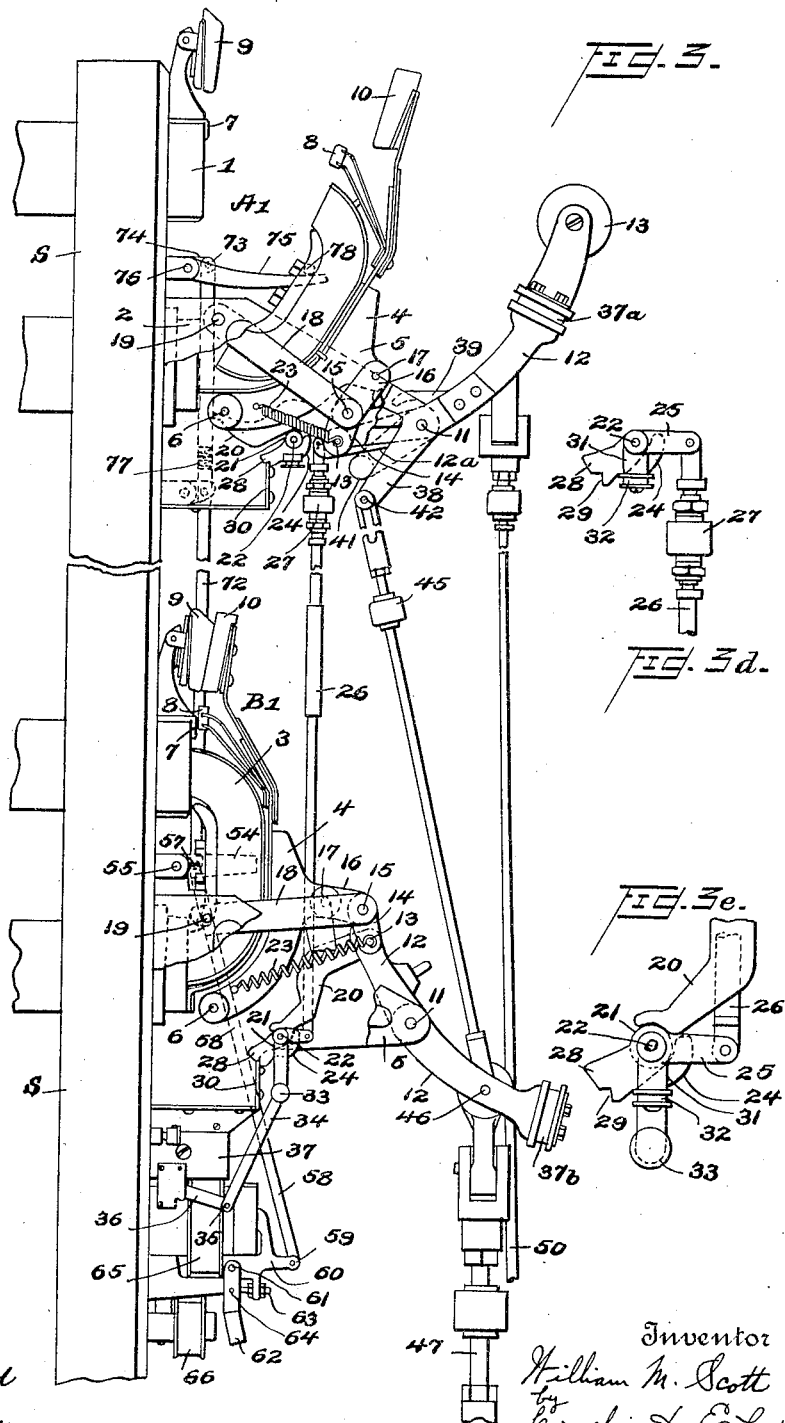

W. M. SCOTT.
CONTROL SYSTEM.
APPLICATION FILED NOV. 12, 1917.
1,336,488.
Patented Apr. 13, 1920.
5 SHEETS—SHEET 4.
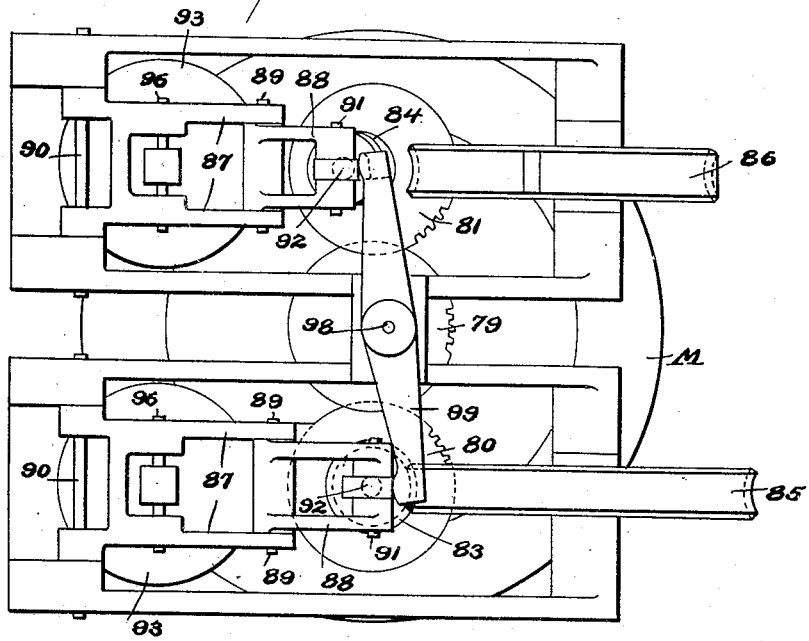
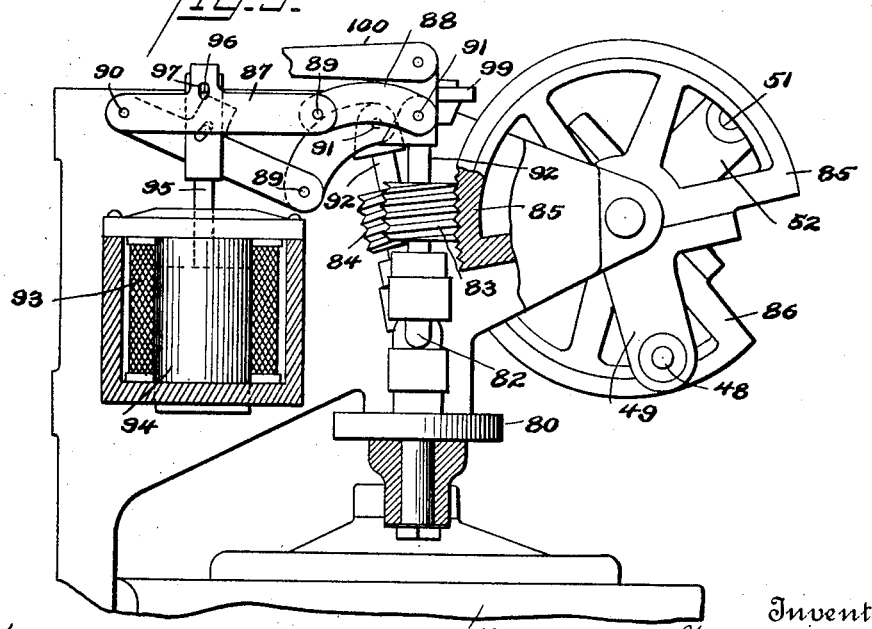

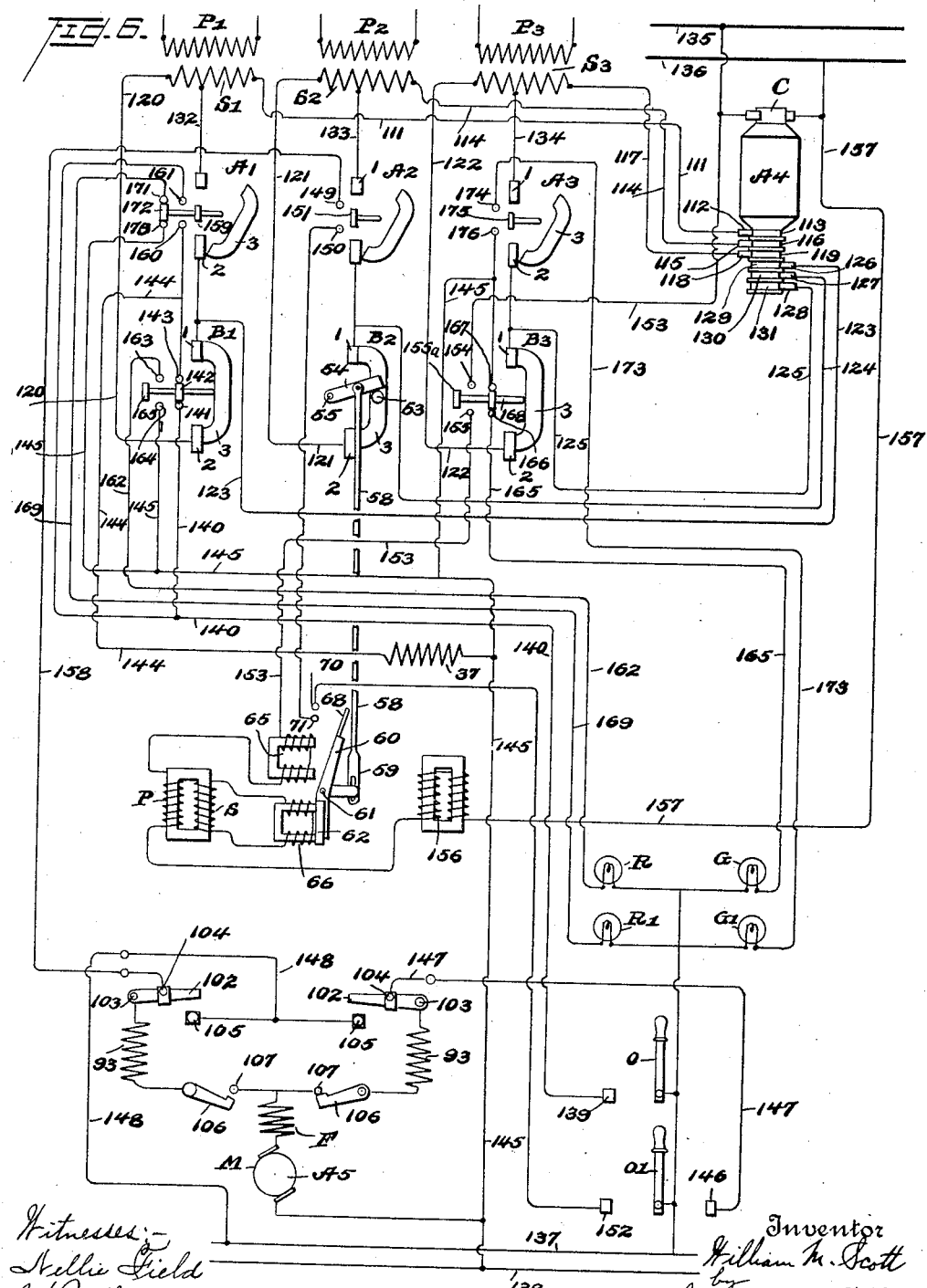

UNITED STATES PATENT OFFICE.

WILLIAM M. SCOTT, OF TREDYFFRIN TOWNSHIP, CHESTER COUNTY, PENNSYLVANIA.

CONTROL SYSTEM.

1,336,488.      Specification of Letters Patent.      Patented Apr. 13, 1920.

Original application filed November 4, 1914, Serial No. 870,176. Patented December 18, 1917, No. 1,250,674. Divided and this application filed November 12, 1917. Serial No. 201,615.

*To all whom it may concern:*

Be it known that I, WILLIAM M. SCOTT, a citizen of the United States, residing in Tredyffrin township, in the county of Chester and State of Pennsylvania, have invented a new and useful Control System, of which the following is a specification.

My invention resides in a system for controlling an electric motor, particularly an alternating current motor; and my invention resides more particularly in a system for controlling a rotary converter, as hereinafter described and claimed.

This application is a division from my prior application Serial Number 870,176, filed November 4, 1914, patented Dec. 18, 1917, No. 1,250,674.

For an illustration of one of various forms my invention may take, reference is to be had to the accompanying drawings, in which:

Figure 1 is a side elevational view of switching apparatus and a motor control or drive therefor.

Fig. 1ª is a fragmentary side elevation of circuit breaker parts.

Fig. 2 is a front elevational view of the apparatus shown in Fig. 1.

Fig. 3 is a side elevational view of part of the apparatus shown in Figs. 1 and 2, on larger scale.

Fig. 3ª is a fragmentary side elevational view, on larger scale, of elements of the upper switch mechanism shown in Figs. 1, 2 and 3.

Fig. 3ᵇ is a front elevational view of the parts shown in Fig. 3ª.

Fig. 3ᶜ is a fragmentary side elevational view, on larger scale, of parts of the lower switching mechanism shown in Figs. 1, 2 and 3.

Fig. 3ᵈ is a side elevational view, on larger scale, of parts of the upper switching mechanism shown in Figs. 1, 2 and 3.

Fig. 3ᵉ is a fragmentary side elevational view, on larger scale, of parts of the lower switching mechanism of Figs. 1, 2 and 3.

Fig. 4 is a top plan view, on larger scale, of motor actuated gearing and associated parts.

Fig. 5 is a side elevational view, partly in section, of the parts shown in Fig. 4.

Fig. 6 is a diagrammatic view illustrating one of the circuit arrangements of my invention.

Fig. 7 is a fragmentary top plan view of one of the control switches.

Referring to the drawings, a suitable base S of insulating material, such as a marble, slate or other switchboard, carries the three upper switches or circuit breakers $A^1$, $A^2$ and $A^3$, similar to each other, and disposed side by side. And below these are the three switches or circuit breakers $B^1$, $B^2$ and $B^3$, disposed side by side, and similar to each other, and in the case illustrated, of larger current carrying capacity than the upper switches or breakers. And below the switches or circuit breakers, upon the switchboard S, or upon any other suitable support, is disposed the motor M for operating them under certain circumstances to be described.

The upper and lower switches or circuit breakers are, in the main, here illustrated as having similar operating parts, though my invention is not limited to this similarity, and a detailed description of one of them will largely suffice for all, similar reference characters being used throughout to designate similar elements or features.

Each of the switches or circuit breakers comprises the main stationary contacts 1 and 2 adapted to be engaged and electrically connected to each other by the movable laminated contact member 3 secured upon the arm 4 pivoted to the housing or bracket 5 at 6. Above the contact terminal 1 is a stationary metallic shunt contact 7 and shunt carbon contact 9, with which coöperate respectively the movable metallic shunt contact 8 and shunt carbon contact 10, the contacts 8 and 10 being movable with the main bridge 3, these shunt contacts breaking circuit in succession after the member 3 separates from the main contacts in the well known manner.

Pivoted to the housing 5 at 11 is a lever 12 which may be provided with a hand grip 13. The inner or left hand portion of the lever 12 in the lower breakers forms a toggle-link rigid with the lever 12, while in the upper breakers this element is an independent link 12ª; in all the breakers such link is pivoted at 13 to a short link 14 pivoted at 15 to the short link 16 pivoted at 17 to the arm 4. And the link or lever 18 is pivoted at 15 to the relatively movable links 14 and 16 and at its other end at 19 to the base or housing. This system of levers or links serves for actuating the movable contact member 3 which is locked or latched in circuit closing position in engagement with contacts 1 and 2 by a dog latch 20 independently pivoted at one end at a pivot 13 and thrusting at its other end against the roller 21 pivoted to the housing or base at 22 as most clearly shown in the lower breaker in Fig. 3. A spring 23 is attached at its one end to the arm 4 and at its other end to the pivot 13, and when the switch or breaker is in closed position the spring is under tension, and when the latch is tripped pulls upon the pivot 13 and assists in the opening of the breaker by collapsing the toggles. Pivoted at 22 is the latch actuator 24 for disengaging the latch or dog 20 from the roller 21 to allow collapsing of the toggles and the opening of the switch or breaker. As seen more clearly in Figs. 3ᵈ and 3ᵉ there is secured to the latch actuator 24 a crank 25, the crank 25 of the upper breaker being connected with the crank 25 of the lower breaker by the rod 26 which is adjustable as to its length at 27. In both the upper and lower breakers the latch actuator is supplied with a tail 28 having the notch 29 engaging the plate 30 to prevent clockwise movement of the latch actuator 24 beyond a predetermined normal position, and limiting its counter-clockwise movement, which latter movement, however, is sufficient to disengage the dog from the roller. The latch actuator 24 has also a downwardly extending portion 31, these members 31 in the upper series of breakers being connected together by a bar 32 and similarly in the lower series of breakers by a bar 32. And to either bar 32 may be attached a handle 33 for simultaneously moving all the latch actuators manually. The handle lever 33 has pivoted to it a lever 34, pivoted at 35 to the pivoted armature 36 of a trip coil 37.

The levers 12 of the upper breakers are connected together by the bar 37ᵃ and a similar bar 37ᵇ connects the levers 12 of the lower breakers together, the levers 12 of the upper breakers, however, being movable independently of the levers 12 of the lower breakers, when the latter are in the open position.

Secured to and movable with the upper levers 12 are one or more cranks 38 and secured to each upper lever 12 is a lug 39, adapted upon counter-clockwise movement of the lever 12, as viewed in Fig. 3ᵃ, to engage the top of the link or lever 12ᵃ which is movable independently of the lever 12 upon the pivot 11. Secured to each upper lever 12 is an arm 40 whose end 41, upon clockwise movement of the lever 12, is adapted to engage the under side of the link 12ᵃ, and in counter-clockwise movement of the upper lever 12 is adapted to engage the dog latch 20 to disengage it from the roller 21, preferably slightly in advance of engagement of link 12ᵃ by lug 39, as shown in Fig. 1ᵃ.

The crank 38 carries at its outer end a pin 42 disposed in the slot 43 of the rod 44, adjustable as to its length at the insulating section 45, and pivoted at its lower end at 46 to the lower levers 12, the pin and slot forming a lost motion connection between upper and lower levers 12. And pivoted to the lower levers 12 at 46 is the downwardly extending connecting rod 47, adjustable as to length, and pivoted at its lower end at 48 to the crank 49. And pivoted to the upper levers 12 is the connecting rod 50 pivoted at 51 at its lower end to the crank 52, the cranks 49 and 52 being driven by the motor M at different times only, as hereinafter described.

In one or more of the lower breakers is a lug 53, see Fig. 3ᵉ, in fixed relation with the movable contact bridge 3. When the lower breakers are open there is adapted to engage with the lug 53 a block or prop 54 pivoted to the base at 55, to mechanically lock or block the lower circuit breakers in open circuit position. Secured to the block 54 is a short crank 56 to which is pivoted at 57 the rod 58 which extends downwardly and has a pin and slot connection at 59 with the armature lever 60 pivoted to the base at 61. Also pivoted at 61 is the armature member 62 movable in fixed relation with the armature 60 in virtue of the adjustable screw 63, carried by an arm on the member 60, and having a pin connection at 64 with the armature 62, the adjustment of the screw 63 causing adjustment of the armature 62 with respect to the armature 60. The armature 60 coöperates with the electro-magnet 65 and the armature 62 coöperates with the electro-magnet 66. Movable with the armature member 60 is a mechanical connection 67, see Fig. 7, to a movable switch arm 68 pivoted at 69 and connecting thereat with the stationary contact 70 and adapted to engage the second stationary contact 71, as illustrated diagrammatically in Fig. 6.

Pivoted at 57, Fig. 3ᵉ is a vertically extending rod 72 connected at its upper end to the pin 73 of a short crank 74 secured to the cam arm 75 pivoted at 76, a spring 77 intervening between the upper and lower portions of the rod 72 to form a yielding connection between them. Adapted to ride upon the top surface of the arm 75 is a pin or roller 78 movable with the upper bridge member 3.

The motor M is mounted with its armature shaft vertical and on the upper end of the armature shaft is secured the gear 79, Fig. 4, meshing with and driving the gears 80 and 81 having the universal joint connections at 82 with the worms 83 and 82 adapted to mesh with and drive the worm gears 85 and 86 respectively, the crank 49 being driven by the half worm gear 85 and the crank 52 by the half worm wheel gear 86. Each worm may be tilted toward the right and left, as viewed in Fig. 5, about the point 82 by a toggle comprising links 87 and 88 pivoted to each other at 89, link 87 being pivoted to the base at 90 and the link 88 pivoted at 91 to the upper end of the worm supporting shaft 92. With each of these toggles is associated a solenoid 93 having the vertically movable core 94 having a rod 95 carrying at its upper end a pin 96 engaging in a slot 97 in the toggle link 87. When the solenoid 93 is energized it attracts its core 94 upwardly and will straighten the toggle and shift the associated worm into mesh with the corresponding worm gear. And upon deënergization of the solenoid 93 the core 94 will drop, and soon after it starts to drop the pin 96 will engage in the lower end of the slot 97 and deliver a blow to the toggle-link 87, collapsing the toggle and thereby withdrawing the worm from mesh with its gear. Pivoted at 98, Fig. 4, is a bar or beam 99 adapted at its ends to engage or be engaged by the upper ends of the shafts 92. Its function is to positively lock one worm, as 84, out of mesh with its gear 86 before the other worm 83 can be forced into mesh with its gear 85 by its toggle; a certain amount of lost motion being allowed between the beam 99 and the heads of the shafts 92. Movable with and pivoted to each shaft 92 is a lever 100 pivoted at its other end at 101, see Fig. 1, to a bell crank contact lever 102 pivoted at 103 and adapted to engage the stationary contacts 104 and 105 alternately. These fixed contacts are so disposed that the movable contact 102 in passing from one to the other establishes the second contact before breaking the first. And a movable contact 106 is adapted to make and break contact with the stationary contact 107, the contact 106 being that of a snap switch mechanism actuated by the lever 108 connected by rod 109 to the crank 110, there being one of these switches for each worm gear, the cranks 110 being driven by the gears 85 and 86.

The apparatus hereinbefore described is adaptable for various uses, one of which will now be described.

In Fig. 6 $P^1$, $P^2$ and $P^3$ are the primaries of a three-phase transformer whose secondaries deliver current which is to be converted into direct current. $S^1$, $S^2$ and $S^3$ are the secondaries of these transformers. One terminal of the secondary $S^1$ connects by conductor 111 with the brush 112 bearing upon the slip ring 113 of the armature 44 of a multi-phase rotary converter whose field magnet is not illustrated. Similarly one terminal of the secondary $S^2$ is connected by conductor 114 with brush 114 bearing upon slip ring 116; and one terminal of secondary $S^3$ connects by conductor 117 with brush 118 bearing upon slip ring 119. The other terminals of the secondaries $S^1$, $S^2$ and $S^3$ connect by conductors 120, 121 and 122, respectively, with the lower terminal blocks 2 of the lower breakers $B^1$, $B^2$ and $B^3$, respectively. The upper terminal blocks 1 of these lower breakers connect with the lower terminal blocks 2 of the upper breakers and by conductors 123, 124 and 125, respectively, with the brushes 126, 127 and 128 bearing respectively upon the slip rings 129, 130 and 131 of the armature $A^4$. Taps to points intermediate the ends of the secondaries $S^1$, $S^2$ and $S^3$ connect by conductors 132, 133 and 134 with the upper terminal blocks 1 of the upper breakers $A^1$, $A^2$ and $A^3$, respectively.

It will thus appear that when the upper breakers are closed, and the lower breakers are open, half, or less than whole, voltage of the secondaries $S^1$, $S^2$ and $S^3$ is impressed upon the armature $A^4$, as when starting up the rotary converter from rest; and that when the upper breakers are open, and the lower breakers closed, as illustrated, full voltage of the secondaries is impressed upon the armature $A^4$ as when the rotary has come up to speed and is delivering current from the direct current commutators C to the direct current buses or supply conductors 135 and 136.

And the switching mechanism structure is such that the upper and lower breakers cannot be in circuit closing position simultaneously, for under such condition part of each secondary would be short circuited.

It will be understood, therefore, that for the purpose described, the upper and lower breakers may be open simultaneously, cannot be closed simultaneously, but either the upper or the lower may be closed, in which case the lower or the upper will be open.

Supposing the rotary converter to be running at full speed and delivering energy to the direct current buses 135 and 136, and it is desired to shut the rotary down, it is simply necessary to trip the lower breakers, which is accomplished as follows:

The operator's tripping switch O, whose one terminal is connected to the supply conductor 137, which, with conductor 138, forms a supply circuit (such as a direct-current supply circuit, which may be connected with the conductors 135 and 136, or to some other suitable direct current source) is thrown over into engagement with contact 139 whereupon current will flow from conductor 137, through the switch O, conductor 140 to contact 141 through the connecting bridge 142 to contact 143, conductor 144 through the trip coil winding 37, and conductor 145 to the conductor 138, energizing the trip coil 37 and causing its armature 36, Figs. 1 and 3, to be attracted upwardly and transmit through rod 34 a clockwise movement to the latch actuators 24 of the lower breakers which thereupon dislodge the dogs 20 from the rollers 21, allowing the toggle mechanism of the lower breakers to collapse, assisted by their springs 23, and to cause the bridging contacts 3 of the lower breakers to separate from their fixed contacts 1 and 2, thereby disconnecting the rotary converter from the transformer secondaries. While the lower breakers were closed, the upper breakers were open, as illustrated in Fig. 6, and accordingly the upward movement on the rod 26, occasioned by the energization of the trip coil 37, produced no effect in the upper breakers. This tripping operation having been accomplished, the switch O is returned to open position shown. When the lower breakers are thus tripped and moved to their open circuit positions, the upper breakers being open, the roller 78 has pressed downwardly upon lever 75 and therefore put the spring 77 between the upper and lower parts of rod 72 under compression, and accordingly the block 54 is thrust into the blocking position against lug 53 as indicated in Fig. 3ᶜ, thus positively blocking the lower breakers open, once having been tripped and opened.

It will now be impossible to close the lower breakers, which would result in throwing full voltage of the secondaries of the transformers upon the armature $A^4$ of the rotary converter which is now at rest. The locking block 54 can be withdrawn only by an upward movement of the rod 72 and this can occur only when the upper breakers are first closed, in which case the roller 78 will move inwardly toward the pivot of the cam arm 75 to remove the downward pressure previously exerted by the spring 77. But this release of pressure of the spring 77 is not sufficient to remove the block 54 from lug 53 and it must be moved upwardly by the rod 58 controlled by the armature member 60, and this will not occur except by later described predetermined electrical conditions obtaining.

To close the upper breakers, and thus throw less than the full voltage of the transformer secondaries upon the rotary converter to start it, the second operator's switch $O^1$, connected to conductor 137, is thrown over into engagement with the contact 146 connected by conductor 147 with the right hand contact 104 thence through switch blade 102 and contact 103 through the right hand solenoid winding 93 through the switch 106, 107 and thence through the series field F and armature $A^5$ of the motor M to the other conductor 138 of the supply circuit. This energizes the solenoid 93 and starts the motor M, which always rotates in the same direction, the solenoid 93 thereupon expanding the toggle which shifts the worm 84, driven by motor M, into mesh with the gear 86, rotating said gear in a clockwise direction, as viewed in Fig. 5, thereby operating the crank 52 which pulls downwardly upon the rod 50 attached to the arms 12 of the upper breakers. These arms 12, now moving in clockwise direction as viewed in Fig. 3, actuate the members 41 which engage the lower sides of the independent links $12^a$ which are accordingly rotated in a clockwise direction about their pivots 11, thus actuating the toggle mechanism of the upper breakers to move their bridging members 3 into engagement with their contacts 1 and 2, and when this position is reached the dog latches 20 in the upper breakers engage their rollers 21 and thus lock the upper breakers in circuit closing position, whereupon the low voltage is impressed by the transformer secondaries upon the rotary converter which is accordingly started. And since during the starting period the load upon the rotary converter is slight, the energy required to start it is relatively small, and accordingly the upper circuit breakers need have current carrying capacity less than the lower circuit breakers which must transmit the alternating current energy which is converted into the direct current energy constituting the load upon the rotary converter.

As the motor M is started, the switch 102 is shifted by the toggle controlled by solenoid 93 into engagement with contact 105, which localizes the motor circuit, thus robbing the switch $O^1$ of control of the motor M, which, having once been started through switch $O^1$ continues to run because current is now supplied independently of switch $O^1$ through conductor 148.

As the upper breakers reach closed position, the crank 110 associated with the gear 86 has tripped the right hand snap switch 106 breaking the motor circuit at contact 107, the motor then coming to rest, and the solenoid 93 deënergized with resultant collapsing of the toggle, restoring the switch 102 to the position illustrated in Fig. 6, and withdrawing the worm 84 from mesh with gear 86. If, however, the worm 84 should stick in mesh with the gear 86 the next energization of the other solenoid 93 actuating the other worm 83, would cause a tilting of the beam 99 and a positive actuation of the worm 84 away from its gear 86, before worm 83 could engage its gear 85. And this operation is mutual between the two worms. And when the upper circuit breakers are being closed by closing the motor circuit as described, the energization of the solenoid 93 which shifts the worm 84 into mesh with gear 86 tilts the beam 99 and so prevents the other worm 83 coming into mesh with its gear 85, thus preventing by any mischance the operation of the lower breakers by the motor M.

And the closing of the lower breakers is also prevented because the left hand solenoid 93, controlling worm 83, cannot be energized because its and the motor's circuit is open at contacts 149, 150 and 151, and contacts 70 and 71, even should the handle $O^1$ be thrown over into engagement with contact 152 in an attempt to close the lower breakers. And for the further reason that the lower breakers are blocked open by the blocks 54.

As the upper breakers are closed, however, the contact 151 is forced into engagement with contacts 149 and 150, bridging them, but the circuit remains open at contacts 70 and 71 for a time because, when the upper breakers are closed, the rotary converter starts from rest, and at first there is delivered from the commutator C an alternating or fluctuating current of frequency corresponding with the frequency of the alternating current supplied by the transformers. As the armature $A^4$ increases in speed, however, the frequency of the potential at the commutator C diminishes, until, when the armature $A^4$ is at full speed, a continuous or non-fluctuating potential exists at a commutator C. From one brush of the commutator C extends conductor 153 to the contact 154 in communication with the contact 155 through the bridge contact $155^a$, it being remembered that the lower breakers are open. From contact 155 the conductor 153 extends to one terminal of the winding of the electro-magnet 65 whose other terminal connects with one terminal of the primary $p$ of a transformer whose secondary $s$ is connected to the terminals of the electro-magnet 66, the other terminal of the primary $p$ connecting with one terminal of the choke coil 156 whose other terminal connects by conductor 157 with the other brush of the commutator C.

Disregarding for the moment the transformer $ps$, the electro-magnet 66 and the choke coil 156, the electro-magnet 65 may itself have such inductance that as the rotary converter is started and is below normal speed, the current through the electro-magnet 65, due to the fluctuating potential delivered by commutator C, will be too slight to attract the armature 60, but when the frequency becomes sufficiently low, or a continuous direct current is delivered from commutator C, as when armature $A^4$ has attained full speed, the magnet 65 will attract its armature 60 and accordingly push upwardly upon the rod 58 and disengage the locking block 54 from the lug 53, thus unlocking the lower breakers and making it possible, as later described, to close them by the motor M.

But to make it even more certain that the armature 60 shall not be attracted until the armature $A^4$ has come up to speed, the extra inductance 156 may be included in the circuit of the electro-magnet 65, this extra inductance further insuring that the current in the electro-magnet 65 cannot rise to necessary value to attract armature 60 until the armature $A^4$ has attained suitable speed.

Or the choke coil 156 may be omitted and the transformer $ps$ employed, in which case when the armature $A^4$ is below suitable speed the fluctuating current through the primary $p$ produces an alternating current in the secondary $s$ which energizes the electro-magnet 66 which holds the armature 62 and thereby opposes an attractive force to the armature 60 preventing its attraction by the electro-magnet 65. And as the frequency of the alternating or fluctuating current decreases, the transformer secondary current through magnet 66 decreases while the current through the electro-magnet 65 increases, until finally when the armature $A^4$ has attained suitable speed the electro-magnet 65 draws armature 60, thus actuating the rod 58. However, by using both the transformer and magnet 66 and the choke coil in conjunction with the electro-magnet 65 the latter cannot attract its armature 60 until the armature $A^4$ has attained suitable speed, the electro-magnet 66 operating as the holding or opposing magnet until the frequency has become practically nil in the circuit of conductors 153 and 157, and the device as a whole serving to sharply differentiate between fluctuating and direct current. And when this condition is reached, not only does the armature 60 actuate the rod 58 as described but it actuates the contact member 68 to bridge the contacts 70 and 71, thus finally closing this circuit, except at the contact 152, through the left hand solenoid 93 and the motor M.

The lower breakers may now be closed by throwing the operator's switch $O^1$ into engagement with contact 152 whereupon current will flow through the switch $O^1$ from conductor 137 through contacts 70, 68, 71, 150, 151, 149 and thence through conductor 158, contact 104, switch 102, contact 103, solenoid 93, the now closed left hand motor switch 106, 107 and through the motor to the conductor 138. In consequence the left hand solenoid 93 actuates its toggle and moves the worm 83 into mesh with gear wheel 85, the beam 99 in the meantime being tilted to prevent engagement of worm 84 with gear 86, and the motor starting, rotates the gear 85. Immediately the worm has been shifted, the switch 102 leaves contact 104 and engages contact 105, thus robbing the operator's switch $O^1$ from further control of the circuit traced, and accordingly the motor continues to rotate and the crank 49 pulls downwardly upon the rod 47, which accordingly rotates the arms 12 of the lower breakers in a clockwise direction about their pivots 11, as viewed in Figs. 1 and 3, thereby expanding the toggle mechanisms of the lower breakers and moving their members 3 into engagement with their terminal blocks 1 and 2. And the latches 20 of the lower breakers engage their rollers 21 and lock the breakers in circuit closing position, whereupon the transformers supply alternating current energy at full voltage through the lower breakers to the rotary converter which delivers direct current to the buses 135 and 136.

But as the rod 47 begins to descend the rod 44, actuated with the rod 47, pulls downwardly upon the crank 38 attached to the arms 12 of the upper breakers. This counterclockwise movement of the arms 12 in the upper breakers, as viewed in Figs. 1 and 3, causes the members 41 to engage the dog latches 20 of the upper breakers and disengage them from their rollers, thus unlatching the upper breakers which will accordingly fly to open circuit position. But should the toggle mechanism of the upper breakers stick for any reason, the members 39 will engage the upper sides of the links $12^a$ and positively collapse the upper toggles, further insuring that the upper breakers shall be tripped and positively opened as the lower breakers move toward circuit closing position. This insures that the upper breakers will be open before the lower breakers are closed, and prevents short circuiting of the transformer secondaries $S^1$, $S^2$ and $S^3$ above referred to.

And when the upper circuit breakers are thus opened, the rollers 78 will depress the cam lever 75, and accordingly compress the spring 77 in the rod 72, preparatory to again setting the locking block 54 in the lower breakers when they open either in response to energization of the trip coil 37 or for any other cause, so that the upper breakers must again first be closed before the lower breakers can be closed.

When the lower breakers have moved to circuit closing position and there locked, the upper circuit breakers are all open, and the circuit through the electro-magnet 65, transformer $ps$ and choke coil 156 is opened at contacts 154 and 155, because the bridge 3 of the breaker $B^3$ has separated the bridging contact 156 from them. And the circuit of the trip coil 37 has been closed as indicated at contacts 141, 142 and 143 at breaker $B^1$; and this trip coil 37 can be energized by throwing the operator's lever O into engagement with contact 139 whereupon the lower breakers will be tripped by actuation of their latch actuators 24 by the armature 36. And when the upper breakers are closed the circuit of the trip coil 37 may be closed by operator's switch O engaging contact 139, because then the bridging contact 159 is in engagement with contacts 160 and 161, the switch formed by these contacts being in parallel with the switch whose contacts are 141 and 143 at the lower breaker $B^1$, these switches being closed at different times, that is, only when their associated breakers are closed.

With the apparatus described may be associated suitable light indicators or signals. These are indicated at R, $R^1$, G and $G^1$, incandescent lamps R, $R^1$ being, for example, red, while lamps G, $G^1$ are, for example, green. All these lamps have one terminal connected to the conductor 137. The red lamp R has its other terminal connected through conductor 162 with contact 163 which is adapted to be connected with contact 164 by the bridging contact 165 when the lower breakers are open, the contact 164 communicating through conductor 145 with the conductor 138. The glowing of the lamp R thus indicates that the lower breakers are open, it being understood that the switches O and $O^1$ and the lamps may be remote from the motor M and the apparatus actuated thereby. When the lower breakers are closed, as indicated, the lamp G is glowing because current is passing through it from conductor 137, through conductor 165, contacts 166 and 167 bridged by contact 168, contact 167 communicating with conductor 138 through conductor 145. Thus, when the lower breakers are closed, the green light G is illuminated and when they are open the red light R is illuminated and the green light G extinguished. Similarly, when the upper breakers are open, the red lamp $R^1$ is illuminated by current from conductor 137 through conductor 169, contacts 170 and 171 bridged by the contact 172, conductor 170 connecting through conductor 145 with conductor 138. And when the upper breakers are closed the lamp $R^1$ is extinguished and the green lamp $G^1$ is lighted by current passing therethrough from conductor 137 over conductor 173 connecting with contact 174 communicating through bridging contact 175 with contact 176 which communicates with conductor 138 through conductor 145.

It will be understood that the herein described apparatus which differentiates between fluctuating or alternating current of different frequencies or between fluctuating or alternating current and direct current may be utilized for purposes other than herein specified, as, for example, for controlling an electric circuit, to open or close the same, which circuit may include any type of translating device, such as a lamp, signal, etc. And it will be understood that the member 60 in addition to performing the controls herein described may control a lamp or signal circuit to indicate that the armature $A^4$ has attained a predetermined speed, as synchronous speed. Or the member 60 may trip a latch or other restraining means of a circuit breaker or switch, by movement in either direction.

While the apparatus herein described is such that the switches may not be simultaneously closed, but both may be simultaneously open or either one closed, it will be understood that my invention embraces also the reverse conditions, that is, where two switches may be simultaneously closed, either one closed, or both may not be simultaneously open. And it will accordingly be understood for the sake of brevity in the claims, that the closed position will be referred to as the "normal" position and the open position as the "abnormal" position and that these terms include the reverse conditions referred to.

What I claim is:

1. The combination with a converter of alternating current into direct current, of switches controlling delivery of alternating current of different voltages to said converter, means positively locking one of said switches in open position against actuation until another of said switches has been opened, and means for freeing said one of said switches from said locking means.

2. The combination with a converter of alternating current into direct current, of switches controlling delivery of alternating current of different voltages to said converter, means positively locking one of said switches in open position against actuation until another of said switches has been opened, and means responsive to the speed of said converter controlling said locking means.

3. The combination with a converter of alternating current into direct current, of switches controlling delivery of alternating current of different voltages to said converter, means positively locking one of said switches in open position against actuation until another of said switches has been opened, and means connected to the direct current side of said converter controlling said locking means.

4. The combination with a rotary converter, of switches controlling delivery of alternating current at different voltages thereto, means positively locking one of said switches in open position against actuation until another of said switches has been opened, and means responsive to decrease in frequency of alternating or fluctuating current initially delivered by the direct current side of said converter for releasing said one of said switches from said locking means.

5. The combination with a converter of alternating current into direct current, of switches controlling delivery of alternating current of different voltages to said converter, means positively blocking the higher voltage switch in open position against actuation until said lower voltage switch has been closed and opened, and means for freeing said higher voltage switch from said blocking means.

6. The combination with a converter of alternating current into direct current, of switches controlling delivery of alternating current at different voltages to said converter, means positively blocking the higher voltage switch in open position against actuation until a lower voltage switch has been closed and opened, and means connected to the direct current side of said converter responsive to decrease in frequency of alternating or fluctuating current initially delivered by the direct current side of said converter for releasing said higher voltage switch from said blocking means.

7. The combination with a converter of alternating current into direct current, of switches controlling delivery of alternating current at different voltages to said converter, means blocking the higher voltage switch in open position until a lower voltage switch has been closed and opened, means connected to the direct current side of said converter responsive to decrease in frequency of alternating or fluctuating current initially delivered by the direct current side of said converter for releasing said high voltage switch from said blocking means, a motor for actuating said switches to closed position, and a switch controlled by said second named means controlling said motor.

8. The combination with a converter of alternating current into direct current, of switches controlling delivery of alternating current at different voltages to said converter, means blocking the higher voltage switch in open position until a lower voltage switch has been closed and opened, means connected to the direct current side of said converter responsive to decrease in frequency of alternating or fluctuating current initially delivered by the direct current side of said converter for releasing said high voltage switch from said blocking means, a motor for actuating said switches, means whereby said motor when actuating said higher voltage switch to closed position actuates said lower voltage switch to open position, and a switch controlling the circuit of said motor opened when said lower voltage switch is opened.

9. The combination with a rotary converter, of a source of alternating current therefor, independently operable switches controlling the alternating current delivered to said converter, means preventing said switches from being simultaneously in closed position, and means associated with the direct current side of said converter controlling the order of closure of said switches.

10. The combination with a rotary converter, of a source of alternating current therefor, independently operable switches controlling the alternating current delivered to said converter, means positively locking one of said switches in open position until another of said switches has been closed and then opened, and means associated with the direct current side of said converter controlling the order of closure of said switches, said means being unresponsive during starting of said converter until the fluctuating or alternating current on the direct current side of said converter during starting decreases in frequency to a predetermined point.

11. The combination with a rotary converter, of a source of alternating current supply therefor, low and high voltage switches intervening between said source and said converter, means preventing simultaneous closure of said switches, a motor for actuating said switches dissimultaneously, an operator's switch controlling said motor for actuating either of said switches, and automatic means preventing closure of the high voltage switch by said motor until said converter has attained a predetermined speed.

12. The combination with a rotary converter, of a source of alternating current supply therefor, low and high voltage switches intervening between said source and said converter, means preventing simultaneous closure of said switches, a motor for actuating said switches dissimultaneously, an operator's switch controlling said motor for actuating either of said switches, and automatic means preventing closure of the high voltage switch by said motor until said converter has attained a predetermined speed, said automatic means comprising electro-magnetic means responsive to decrease in frequency of the alternating or fluctuating current delivered by the direct current side of said converter during the starting period.

13. The combination with a converter of alternating current into direct current, of switches controlling delivery of alternating current of different voltages to said converter, means permitting closure of said switches only in a predetermined order, means preventing said switches being simultaneously in closed position, and means connected to the direct current side of said converter controlling the actuation of said switches.

14. The combination with a converter of alternating current into direct current, of switches controlling delivery of alternating current of different voltages to said converter, means positively locking one of said switches against closure until another of said switches has been opened, a motive device for actuating said one of said switches, and means responsive to the speed of said converter controlling said motive device and said locking means.

15. The combination with a converter of alternating current into direct current, of switches controlling delivery of alternating current of different voltages to said converter, means positively locking one of said switches against closure until another of said switches has been opened, said other of said switches and means responsive to the speed of said converter controlling said locking means.

16. The combination with a converter of alternating current into direct current, of switches controlling delivery of alternating current of different voltages to said converter, a latch for each of said switches for restraining the same in closed position, a motive device for actuating said switches, means whereby said motive device in closing one of said switches positively opens another of said switches, means positively locking said one of said switches in open position, and means responsive to the speed of said converter controlling said locking means.

17. The combination with a converter of alternating current into direct current, of switches controlling delivery of alternating current of different voltages to said converter, a latch for each of said switches for restraining the same in closed position, a motive device for actuating said switches, means whereby said motive device in closing one of said switches positively opens another of said switches, means positively locking said one of said switches in open position, and means responsive to the speed of said converter controlling said locking means and said motive device.

18. The combination with a converter of alternating current into direct current, of switches controlling delivery of alternating current of different voltages to said converter, a latch for each of said switches for restraining the same in closed position, a motive device for actuating said switches, means whereby said motive device in closing one of said switches positively opens another of said switches, means positively locking said one of said switches in open position, said other of said switches controlling said locking means, and means responsive to the speed of said converter controlling said locking means.

19. The combination with a converter of alternating current into direct current, of switches controlling delivery of alternating current of different voltages to said converter, a latch for each of said switches for restraining the same in closed position, a motive device for actuating said switches, means whereby said motive device in closing one of said switches positively opens another of said switches, means positively locking said one of said switches in open position, said other of said switches controlling said locking means, and means responsive to the speed of said converter controlling said locking means and said motive device.

In testimony whereof I have hereunto affixed my signature this 9th day of November, 1917.

WILLIAM M. SCOTT.

Witnesses:
   NELLIE FIELD,
   S. H. ROCHESTER.